June 24, 1941.  M. J. GIELEGHEM ET AL  2,247,279
SEAT SLIDE STRUCTURE
Filed March 9, 1939
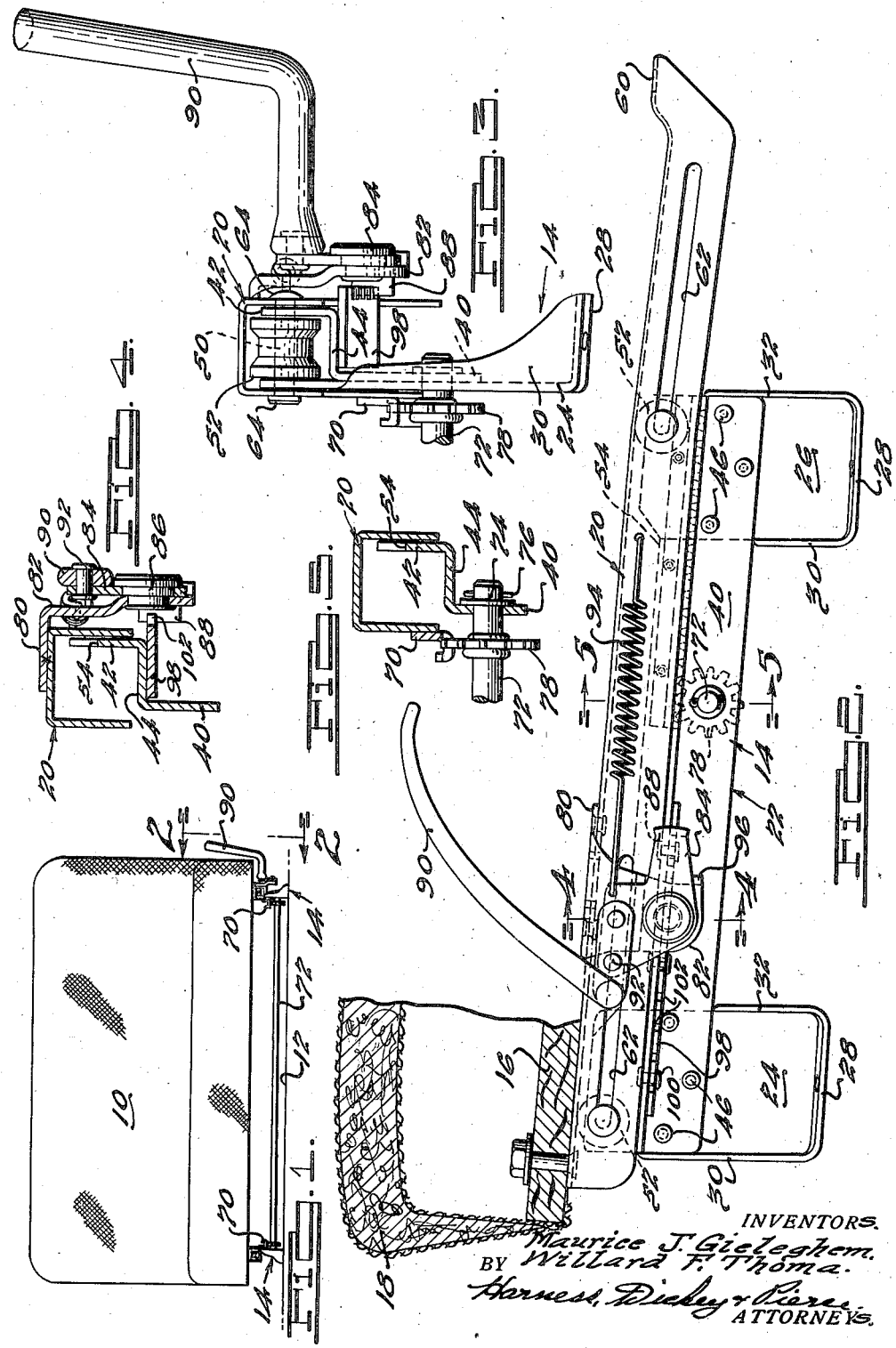
INVENTORS.
Maurice J. Gieleghem.
BY Willard F. Thoma.
Harness, Dickey & Pierce
ATTORNEYS.

Patented June 24, 1941

2,247,279

UNITED STATES PATENT OFFICE 2,247,279

SEAT SLIDE STRUCTURE

Maurice J. Gieleghem and Willard F. Thoma, Detroit, Mich., assignors to National Stamping Company, Detroit, Mich., a corporation of Michigan Application March 9, 1939, Serial No. 260,803

7 Claims. (Cl. 155—14)

This invention relates to means for slidably supporting a seat whereby to permit adjustment in the position thereof, and is particularly applicable for use in connection with the driver's seat of an automobile whereby to permit the position of the driver with respect to the steering wheel and other control members of the automobile to be readily adjusted.

Objects of the invention include the provision of a slidable seat supporting means that is simple in construction, efficient in operation and economical to produce; the provision of a slidable seat supporting means of such construction as to permit it to be constructed substantially entirely from stampings; the provision of a sliding seat support that is of unusually light construction involving a minimum amount of material but at the same time is amply rigid for the purpose for which it is designed; the provision of a seat slide construction that is substantially free from warping and binding in operation; and the provision of a sliding seat support capable of being assembled in its entirety and thereafter interposed between a seat and a supporting surface and secured thereto.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views—

Fig. 1 is a front elevational view of a seat slidably supported for movement in a fore and aft direction by means constructed in accordance with the present invention;

Fig. 2 is an enlarged, partially broken, partially sectioned side elevational view taken on the line 2—2 of Fig. 1 and illustrating in greater detail the construction of the seat slide mechanism;

Fig. 3 is a front elevational view of the seat slide member shown in Fig. 2;

Fig. 4 is an enlarged transverse sectional view taken on the line 4—4 of Fig. 2; and, Fig. 5 is a transverse sectional view taken on the line 5—5 of Fig. 2.

Referring to the drawing and particularly to Fig. 1, a conventional seat is indicated generally at 10 of the type commonly employed as the front or driver's seat of an automobile. The seat 10 is supported upon the floor 12 by means of a pair of supporting devices indicated generally at 14, one positioned adjacent each side of the seat 10 and extending in approximate parallelism with respect to the corresponding side thereof and in parallelism to each other. The supporting devices 14 are identical in construction except that one is righthanded and the other lefthanded, in other words some of the various parts and portions thereof are simply reversed in position from one another, and except that the righthand device 14, as viewed in Fig. 1, is provided with a latch mechanism not present on the lefthand device 14. Consequently a description of one of the supporting devices will suffice as a description of both of such devices and inasmuch as the righthand device 14 includes the latch mechanism this device will be described so as to also explain the construction and operation of the latching mechanism.

Referring to Fig. 2 it will be noted that the seat 10 includes the usual rigid seat bottom frame 16 and padded covering 18 and that the supporting device 14 is interposed between the frame 16 and floor 12. The supporting device 14 is formed of two main parts, namely the slide part indicated generally at 20 and the supporting part indicated generally at 22.

The supporting part 22 includes a front bracket or leg 24 and a rear bracket or leg 26, these brackets being formed from sheet metal so as to provide a planar vertically extending web or main body portion, and outwardly flanged foot 28. Each bracket also includes front and rear marginal flanges 30 and 32, respectively, extending from the outer edge of the corresponding foot 28 upwardly and inwardly toward the web of the bracket 24 or 26. The front flange 30 of the front foot 24 and the rear flange 32 of the rear foot 26 extend upwardly a material distance beyond the upper ends of the corresponding rear and front flanges 32 and 30, respectively, but it will be noted that both of the first mentioned flanges actually stop short of the upper end of each foot as brought out best in Fig. 3.

The feet 24 and 26 are rigidly connected together by means of a Z-sectioned member including vertically directed flange portions 40 and 42 and a connecting horizontally disposed web portion 44. The outer face of the lower flange 40 lies in flat contacting relationship with respect to the outer faces of the webs of the feet 24 and 26 and is rigidly fixed thereto as by means of rivets 46. It will be noted that this Z-sectioned member is so secured to the feet 24 and 26 that the upper edge of the upper flange 42 is substantially aligned horizontally with the upper edges of the feet 24 and 26. In this respect it may be noted that where it is desired that the seat 10 be at a higher elevation above the floor when in its forward position than when in its rearmost position, the feet 26 will be shorter than the feet 24 whereby to achieve this result. As particularly brought out in Fig. 2 it will be noted that in assembling the Z-section member 40, 42, 44 to the feet 24 and 26 the shorter rear flange 32 of the front foot 24 and the shorter forward flange 30 of the rear foot 26 permits the flange 40 to extend thereover and yet bring the opposite ends of the flange 40 into substantially abutting relationship with respect to the upper end of the front flange 30 of the front foot 24 and the rear flange 32 of the rear foot 26, thus not only permitting abutment of the Z-sectioned member with the upper ends of such flanges as a means of locating the members with respect to each other during manufacture but also aiding in providing a more rigid structure generally with the use of a minimum amount of material.

It will be noted that due to the manner of securing the Z-sectioned member to the feet 24 and 26, the upper flange 42 of the Z-sectioned member will be located in spaced and parallel relation with respect to the upper ends of the webs of the feet 24 and 26 and cooperates therewith to form relatively short channels extending lengthwise of the slide. Between the opposite walls of each of such channels a pin or axle 50 is extended in bridging relation thereto and upon each of the pins or axles 50 is rotatably mounted a roller 52, the central portion of the roller being radially inwardly relieved for the purpose of providing clearance for certain bolts, rivets and the like employed in the structure and hereafter more fully described. It might also be noted that it may be preferable in some instances, at least, to cut away the upper central portion of the upper flange 42 of the Z-sectioned member as indicated at 54 in Fig. 2 for the purpose of both enhancing the lightness of the structure, as well as providing clearance for certain parts thereof during relative movement of the two parts 20 and 22.

From the foregoing it will be appreciated that each supporting part 22 as thus far described includes longitudinally spaced feet 24 and 26 rigidly interconnected with each other through the intermediary of the Z-sectioned member the opposite ends of which cooperate with the upper ends of the feet 24 and 26 to form a short pair of longitudinally extending channels within each of which a roller 52 is rotatably supported.

The slide 20 is simply an inverted channel sectioned member preferably formed from sheet metal and preferably, as best brought out in Fig. 2, with the rear end thereof inclined downwardly slightly with respect to the main portion thereof and the extreme rear end thereof preferably bent upwardly to provide a supporting foot 60 for reception of the rear end of the seat frame 16 to which it is suitably secured. As best brought out in Fig. 3 the width of the channel of the slide is sufficient for it to relatively closely but slidably embrace therein the channels formed by the upper ends of the feet 24 and 26 and the upper flange 42 of the Z-sectioned member and is received in embracing relation thereover with the inner surface of the bottom of the U resting upon the rollers 52.

The side walls of the channel slide 20 in line with each of the pins 50 for the rollers 52 are longitudinally slotted as at 62 in parallelism with the adjacent bottom or transverse wall of the channel, the outer ends of the pins 50 extending outwardly through the corresponding slots 62 and being headed over outwardly thereof as at 64 so as to lie in overlapping relation with respect to the outer marginal walls of the slot 62 and in substantial contact therewith. The slide 20 is, therefore, longitudinally slidable with respect to the support 22 over a distance determined by the length of travel of the pins 50 in the slots 62. Attention is called to the fact that the rollers 52 are of a length substantially equal to the distance between the inner faces of the flange 42 of the Z-sectioned member and the opposed face of the upper end of the corresponding leg 24 or 26 and, therefore, serves to space the flange 42 and the web of the corresponding foot from each other at the location of the rollers 52. The inverted channel-shaped slide 20 in outwardly embracing the channels formed by the flange 42 at the upper ends of the feet 24 and 26 serve to brace these parts against spreading and in turn is braced by these parts against movement of its side walls towards each other. The heads 64 of the pins 50 act to prevent spreading of the side walls of the inverted channel sectioned slide member 20. Accordingly, all of these parts cooperate with one another to prevent distortion of the various component parts thereof, to impart strength to one another, and, therefore, cooperate to provide a structure that may be made unusually light, and, therefore, economically, without unduly sacrificing the strength and rigidity thereof.

Particularly where the seat 10 is relatively wide, as for instance where it is intended to seat two or more persons, it will usually be desirable to interconnect the two supporting devices 14 positively for corresponding and equal slidable movement. This is preferably accomplished in the conventional manner by providing a rack on each of the slides 20 and gearing them together by means of a cross-shaft. In the present case a J-sectioned rack 70 is welded, riveted or otherwise suitably secured to the inner side wall of the inverted channel sectioned slide 20, the bottom portion of the J being slotted at regular intervals to provide rack teeth. A shaft 72 is extended between the two opposite supporting members 22 of each support 14 and its opposite end portions are rotatably supported in suitable openings formed in the lower flange 40 of the corresponding Z-sectioned member. A washer 74 slipped over each of the ends of the shaft 72 outwardly of the corresponding flange 40 and held against outward movement thereon by means of a cotter pin 76 serve to maintain the axial position of the shaft 72 with respect to the devices 14. Adjacent each end of the shaft 72 and in vertical alignment with the corresponding rack 70 a gear 78 is suitably fixed to the shaft 72 and lies in meshing engagement with the corresponding rack 70. It will be appreciated that by this construction any movement of one of the slides 20 is necessarily accompanied by an equal movement of the opposite slide and, accordingly, equal sliding movement of both ends of the seat is assured at all times.

With the above described means interconnecting the two slides 20 for equal and corresponding movement it will be appreciated that a latch mechanism provided on one of the supports 14 for latching the slide 20 thereof in longitudinally slidably adjusted position will also suffice to latch the opposite slide 20. Accordingly, in the construction shown a latch mechanism is provided only on the right hand support 14 as viewed in Fig. 1. This latching mechanism is provided by means of an angle-shaped bracket which, as best illustrated in Figs. 2 and 4, includes a horizontally disposed leg 80 which overlies and is rigidly fixed as by welding, riveting, or the like to the upper face of the transverse wall of the channel slide 20. The remaining vertically directed leg 82 is disposed in outwardly spaced and generally parallel relation with respect to the outer side wall of the channel slide 20. A flat sheet metal latch member 84 bears against the outer face of the leg 82 and is pivotally secured thereto by means of a pin 86 for movement in the plane of its thickness. The rear end of the latch member 84 is bent inwardly to form a lug 88 best indicated in Figs. 3 and 4. A handle member 90 is rigidly secured to the latch member 84 as by means of rivets 92 so as to enable the latch member 84 to be manually operated. A coil spring 94 tensioned between the latch member 84 and a remote point on the slide 20 constantly urges such member 84 and consequently the handle 90 in a clockwise direction of rotation as viewed in Fig. 2, the movement of the latch member 84 in this direction being limited by means of a lug 96 struck outwardly from the lower rear portion of the bracket leg 82 in intersecting relation with respect to the path of movement of the latch member 84.

A horizontally disposed plate member 98 is fixed in flat contacting relationship with respect to the lower face of the web 44 of the Z-sectioned supporting member and is suitably secured thereto as by rivets 100 or other suitable means. The outer edge of the plate 98, that is the edge opposite the flange 40, projects outwardly beyond the plane of the flange 42 and the outer marginal edge portion is provided with a plurality of preferably equally spaced slots or notches 102 therein. The outer edge of the plate 98 intersects the path of movement of the lug 88 on the latch member 84 in the direction of movement of the slide 20 on the support 22 and the slots or notches 102 are of a width to receive the lug 88 therein, and the lug 88 is received in one of the slots 102 when the latch member 84 is in at rest position.

It will be appreciated that when the lug 88 is engaged in one of the notches 102 the slide 20 is positively locked against sliding movement on the support 22 and consequently the seat 10 is fixed in position and locked against relative sliding movement with respect to the floor 12. It will also be appreciated that if the upper end of the handle 90 is grasped and employed to effect rotation of the latch member 84 against the tension of the spring 94, the lug 88 will be withdrawn from the notch 102 in which it is then engaged so as to bring the lug 88 above the plane of the plate member 98 upon the occurrence of which the slide 20 and consequently the seat 10 may be shifted forwardly or rearwardly within the limits of movement of the pins 50 in the slots 62 and may be again locked in any desired position of its shiftable movement by releasing the pressure on the handle 90 and permitting the lug 88 to drop into the nearest notch 102 corresponding with such shifted position.

It will be observed that with the above described construction substantially all parts are formed from sheet metal, and that the various parts cooperate with one another to impart a maximum strength and rigidity and at the same time involves the use of a minimum amount of material.

Formal changes may be made in the specific embodiment of the invention shown and described without departing from the spirit or substance of the broad invention, the scope of which is commensurate with the appended claims.

What is claimed is:

1. In a seat slide construction, in combination, a supporting part including a pair of longitudinally spaced feet having planar upper end portions, a Z-sectioned member rigidly interconnecting said feet by securement of one vertical flange thereto and having a second vertically directed flange portion thereof arranged in laterally spaced and parallel relation with respect to the upper ends of said feet, a roller disposed between each of the upper ends of said feet and said second flange portion, an axle for said roller extending between and supported by each of said upper ends of said feet and said second flange portion, and an inverted channel sectioned slide member received over said rollers and bearing thereon.

2. A supporting member for a seat slide comprising, in combination, a pair of foot members having horizontally directed lower portions and aligned vertically directed planar upper portions, a Z-sectioned member spacing said foot members and rigidly interconnected thereto, one flange of said Z-sectioned member lying in flat contacting relationship with respect to said foot members and rigidly secured thereto, the web of said Z-sectioned member extending laterally outwardly away from said foot members, and the remaining flange of said Z-sectioned member extending upwardly in parallel and spaced relation with respect to said planar upper ends of said foot members.

3. A supporting member for a seat slide comprising, in combination, a pair of longitudinally spaced foot members each including laterally directed flanges at the forward and rearward edges thereof, the rearward of said flanges on the forward of said foot members being shorter than the forward flange thereof, and the forward flange of of the rearward of said foot members being shorter than the rear flange thereof, a Z-sectioned member including a horizontally directed central web portion and oppositely directed marginal flanges at the opposite edges thereof, the downwardly extending flange of said Z-sectioned member lying in contacting relation with respect to both of said foot members and being rigidly secured thereto, the forward end of said Z-sectioned member substantially abutting said forward flange on the forward of said foot members and said rearward flange on the rearward of said foot members and extending over the upper end of said rear flange of the front of said foot members and said front flange of the rear of said foot members.

4. A supporting member for a seat slide comprising, in combination, a pair of longitudinally spaced foot members each including laterally directed flanges at the forward and rearward edges thereof, the rearward of said flanges on the forward of said foot members being shorter than the forward flange thereof, and the forward flange of the rearward of said foot members being shorter than the rear flange thereof, a Z-sectioned member including a horizontally directed central web portion and oppositely directed marginal flanges at the opposite edges thereof, the downwardly extending flange of said Z-sectioned member lying in contacting relation with respect to both of said foot members and being rigidly secured thereto, said Z-sectioned member extending over and resting upon the upper end of said rear flange of the front of said foot members and said front flange of the rear of said foot members.

5. In a seat slide structure, in combination, a pair of upwardly directed feet and an interconnecting angular sectioned member rigidly secured thereto, said angular sectioned member having a pair of vertically directed horizontally offset wall portions and said feet each including a vertically disposed wall portion so constructed and arranged as to cooperate with one of said wall portions to space said feet and to cooperate with the other of said wall portions to provide an upwardly opening channel between it and each of said feet, a roller supported between the opposite walls of each of said channels, and an inverted channel shaped slide member received over said channels in embracing relationship with respect thereto and bearing upon the rollers.

6. In a seat slide device, in combination, a pair of longitudinally spaced foot members, a Z-sectioned member arranged with the opposite marginal flanges thereof in vertical relation with one of said flanges rigidly interconnecting and spacing said foot members and with the other flange thereof arranged in laterally spaced and generally parallel relation with respect to the upper end of said feet whereby to form an upwardly opening channel between each of said feet and said Z-sectioned member, a roller disposed within each of said channels and rotatably supported between the opposite walls thereof, and an inverted channel sectioned slide member outwardly embracing said channels and bearing upon said rollers.

7. In a seat slide mechanism, in combination, a supporting member providing an upwardly opening longitudinally extending channel adjacent the upper edge of said support and said channel being supported at one side thereof only, a roller rotatably supported in said channel between the opposite sides thereof, a slide member bearing upon said roller, a pivotable latch carried by said slide member, and a catch member comprising a plate fixed to the bottom wall of said channel and projecting laterally therebeyond and having notches formed in said projecting edge for releasable engagement with said latch member.

MAURICE J. GIELEGHEM.
WILLARD F. THOMA.